(12) United States Patent
Wooley et al.

(10) Patent No.: US 8,992,012 B2
(45) Date of Patent: Mar. 31, 2015

(54) LENS SYSTEMS FOR PRESBYOPIA

(75) Inventors: C. Benjamin Wooley, Jacksonville, FL (US); Thomas R. Karkkainen, Orange Park, FL (US); Ronald J. Clark, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 746 days.

(21) Appl. No.: 13/167,641

(22) Filed: Jun. 23, 2011

(65) Prior Publication Data
US 2012/0327363 A1 Dec. 27, 2012

(51) Int. Cl.
G02C 7/02 (2006.01)
G02C 7/04 (2006.01)

(52) U.S. Cl.
CPC ............... *G02C 7/042* (2013.01); *G02C 7/044* (2013.01); *G02C 2202/22* (2013.01)
USPC .................................................. 351/159.41

(58) Field of Classification Search
CPC ........ G02C 7/024; G02C 7/027; G02C 7/025; G02C 13/005; G02C 7/042; G02C 7/044; G02C 2202/22
USPC ............ 351/159.02, 159.08, 159.74, 159, 78, 351/79
See application file for complete search history.

(56) References Cited

U.S. PATENT DOCUMENTS

| | | | |
|---|---|---|---|
| 5,057,578 | A | 10/1991 | Spinelli |
| 5,314,960 | A | 5/1994 | Spinelli et al. |
| 5,371,147 | A | 12/1994 | Spinelli et al. |
| 5,540,410 | A | 7/1996 | Lust et al. |
| 6,846,892 | B2 | 1/2005 | Kindt-Larsen et al. |
| 2009/0244478 | A1 | 10/2009 | Wooley et al. |
| 2010/0073629 | A1 | 3/2010 | Menezes |

FOREIGN PATENT DOCUMENTS

WO WO 2009/025808 A1 2/2009

OTHER PUBLICATIONS

International Search Report mailed Aug. 23, 2012 for corresponding Patent Application No. PCT/US2012/042159.

*Primary Examiner* — Scott J Sugarman

(57) ABSTRACT

A family of ophthalmic lenses for correcting presbyopia meets constraints for distance vision, near vision, and disparity and may be designed according to a process that incorporates a merit function accounting for binocular visual performance.

19 Claims, 8 Drawing Sheets

LENS SYSTEMS FOR PRESBYOPIA

BACKGROUND

The invention relates to ophthalmic lenses useful for the correction of presbyopia.

As a person ages their eyes are less able to accommodate, or bend the natural lens, to focus on objects that are relatively near to the observer. This condition is known as presbyopia. Similarly, people who have had their natural lens removed and an intraocular lens inserted as a replacement do not generally have the ability to accommodate.

One method to correct for the eye's failure to accommodate is known as monovision in which a single vision lens for correction of distance vision is used in the dominant eye and a single vision lens for correction of near vision is used in the non-dominant eye. Monovision typically results in a loss of stereopsis. Another method for treating presbyopia is the use of bifocal or multifocal contact lenses in both of the individual's eyes. Satisfactory corrections can be obtained with this method but it typically results in a reduction of image contrast and resolution compared to monovision. Yet another method of treating presbyopia is modified monovision. This involves a bifocal or multifocal lens in the first eye and either a single vision lens or a bifocal or multifocal that is different than the first eye lens in the second eye. Modified monovision can require consideration of a large number of possible lenses in order to provide satisfactory lens performance.

Having a family of lenses across a complete or nearly complete range of lens power requirements that optimally correct near vision preferably with the concomitant correction of distance vision is still desirable.

SUMMARY OF THE INVENTION

The invention is a family of lenses comprising combinations of first and second lens selected such that they satisfy the following relationships across the family:

In the lenses of the invention, at least one of the optical surfaces of the lenses can be aspheric. Preferably, both optical surfaces are aspheric.

In one aspect of the invention, lens pairs are selected from a set of lenses to meet add needs from about 0.75 to about 2.50 diopters and refractive needs from about −12.00 to about +8.00 diopters.

In another aspect of the invention, the lenses have an aspheric back surface with an apical radius of about 7.85 mm and a conic constant of about −0.26. One or more peripheral radii surround the central region. These peripheral radii along with the central radius determine the overall fit of the lens. The radii of the surrounding surfaces range from 7.5 to 10.5 mm. The net overall effect of the apical and surrounding radii on the back surface produces a lens which fits similar to a lens of a single monocurve, with a radius between 8.0 to 9.4 mm.

In yet another aspect of the invention each lens has a power profile as shown in FIG. 2, FIG. 3, and FIG. 4.

In a yet further aspect of the invention, a method for correcting presbyopia involves providing two or more lenses, each lens having a power profile different from that of the other lenses from a family of lenses that satisfy the following relationship:

$P = P_0 + b + c_1 \cdot r$ in central zone for $r \leq r_{central}$, $P = P_0 + c_2 \cdot r^2$ in outer zone for $r \geq r_{outer}$, and P is described by a piecewise cubic Hermite interpolating polynomial in the transition region $r_{central} \leq r \leq r_{outer}$ where the constants $P_0$, $c_1$, $c_2$, b, and the form of the piecewise cubic Hermite interpolating polynomial is different for each lens of the family of lenses.

DETAILED DESCRIPTION

The invention provides methods for designing contact lenses, contact lenses designed according to the method, and methods for producing the lens. The lenses provide an improved method for presbyopia correction compared to conventional lenses and methods. The lens pairs according to the invention act synergistically to provide the lens wearer with good binocularity and consistent performance in near, intermediate and distance vision.

Figure 1:
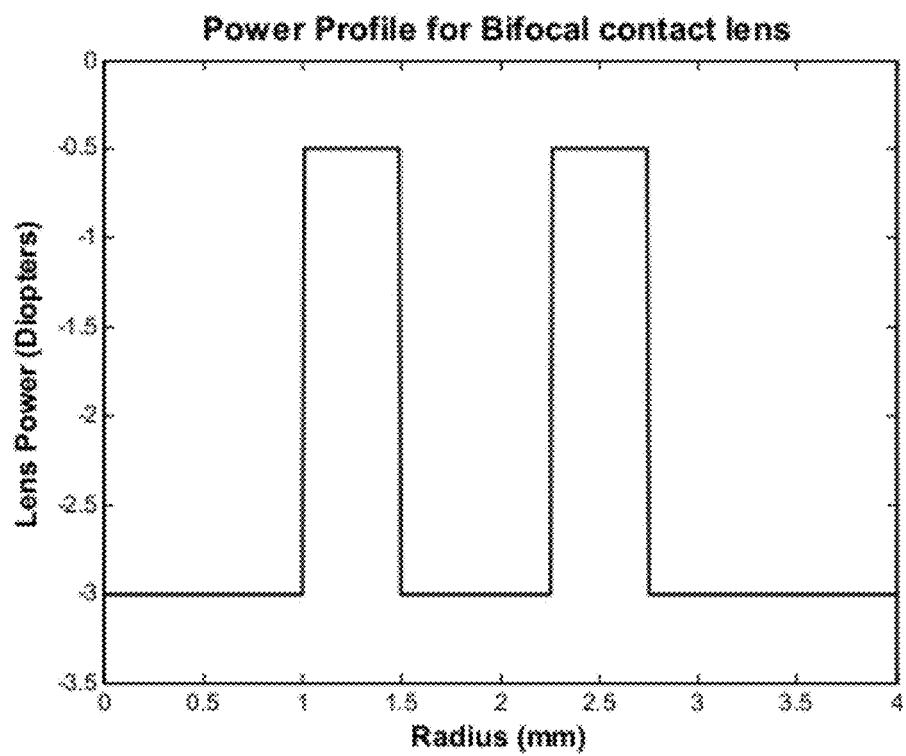
FIG. 1 is a graph depicting the power profile for a contact lens.

A bifocal or multi-focal contact lens can be described by a power profile as shown in FIG. 1. The horizontal axis is the radial distance from the center of the contact lens and the vertical axis is the lens power at that radial position. In the case shown in FIG. 1, the power profile is rotationally symmetric about the center of the contact lens. The contact lens power profile ($P_{CL}$) can be calculated knowing the surface shapes, lens thickness, and lens index of refraction. The power profile for a contact lens can also be determined from a lens wavefront measured with an interferometer. The family of lenses of this invention are described by constraints that are applied to the power profiles across a range of distance and near vision corrections. Constructing the family within these constraints results in a superior balance of far, intermediate, and near vision with unobjectionable disparity between the two eyes across the entirety of defined range.

The contact lens power profile described here is the axial power and is calculated from the wavefront as:

$$P_{CL}(r, \theta) = \frac{1}{r\sqrt{1+\left(\frac{\partial W_{CL}(r, \theta)}{\partial r}\right)^2}} \frac{\partial W_{CL}(r, \theta)}{\partial r} \quad \text{(I)}$$

$P_{CL}(r,\theta)$ is the power at radial position r, and $W_{CL}(r,\theta)$ is the wavefront in polar coordinates.

For wavefronts, $$\left|\frac{\partial W_{CL}(r, \theta)}{\partial r}\right| \ll 1, \text{ so}$$

$$P_{CL}(r, \theta) = \frac{1}{r} \frac{\partial W_{CL}(r, \theta)}{\partial r}. \quad \text{(II)}$$

The residual power of the contact lens on eye is given in Equation III.

$$P(r,\theta)=P_{CL}(r,\theta)-Rx+SA_{eye}*r^2+F, \quad\quad (III)$$

where $P_{CL}$ is the axial power of the contact lens in Diopters;
Rx is the sphere Rx in Diopters;
$SA_{eye}$ is the spherical aberration of the eye (0.06 D/mm$^2$); and
F is the lens fit relative to plano in Diopters.

Although the power profile of the contact lens and the residual power of the contact lens on eye can be described in polar coordinates and are not required to be rotationally symmetric, for simplicity, a power profile that is rotationally symmetric about the center of the lens is shown. In this case, the residual power of the contact lens is given by Equation IV.

$$P(r)=P_{CL}(r)-Rx+SA_{eye}*r^2+F \quad\quad (IV)$$

Figure 5:
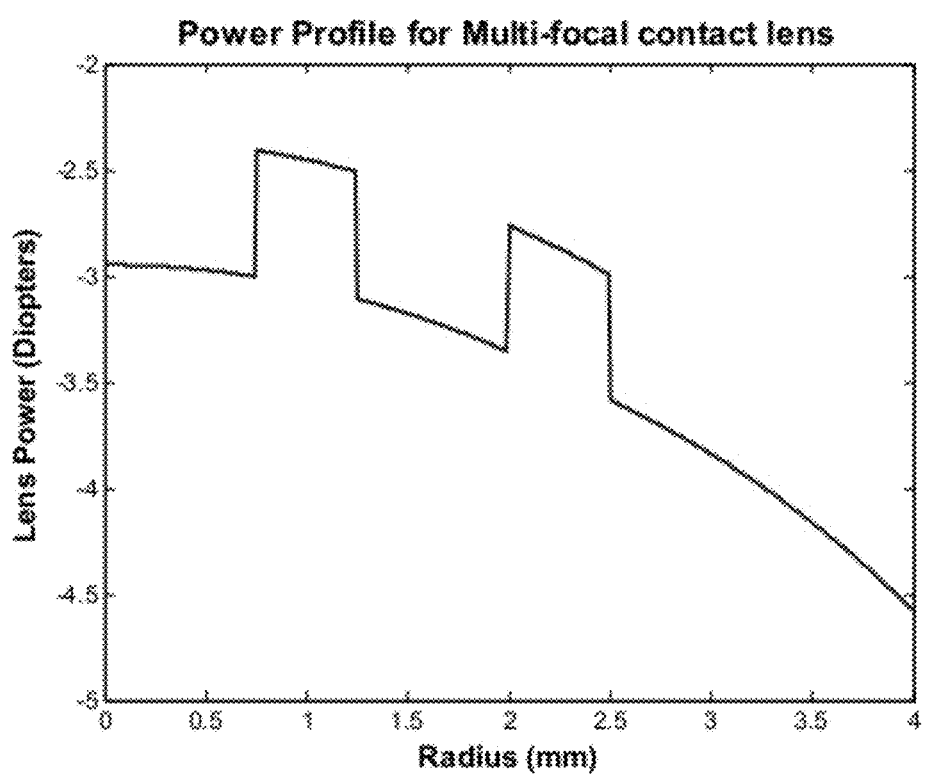
FIG. 5 is a graph depicting a power profile for a multi-focal contact lens for a subject's eye requiring −3.0 D spherical correction.
Figure 6:
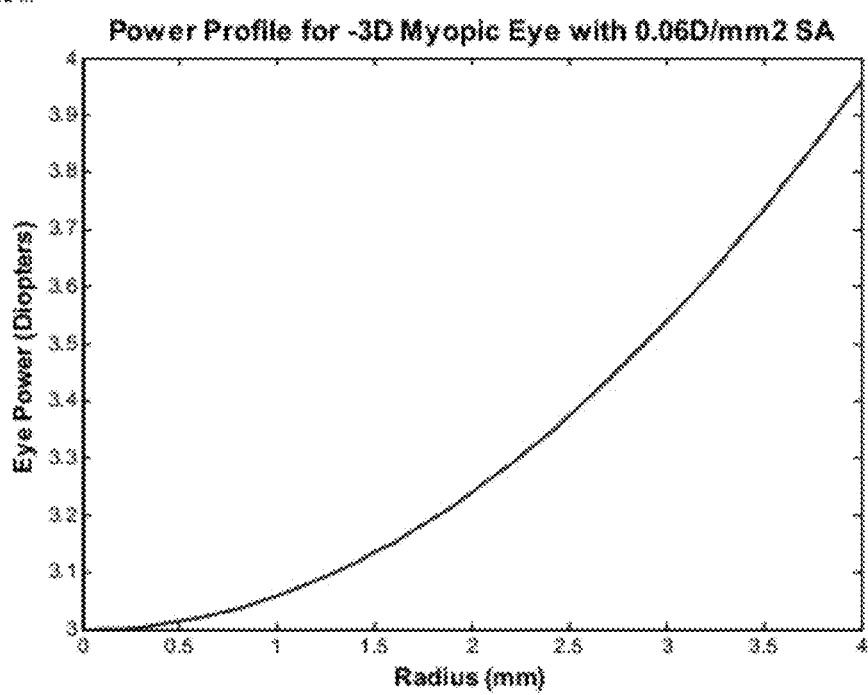
FIG. 6 is a graph depicting the power profile for a −3 D myopic eye with 0.06 D/mm² of spherical aberration.

FIG. 5 shows an example of a power profile of a multi-focal contact lens designed to be placed on a −3 D (Rx=−3.0) myopic eye. FIG. 6 shows the power profile for −3 D myopic eye with 0.06 D/mm$^2$ of spherical aberration. The power profile in FIG. 6 is given by $$P_{eye}(r)=-Rx+SA_{eye}*r^2. \quad\quad (V)$$

For clarity, combining Equations IV and V it can be seen that $$P(r)=P_{CL}(r)+P_{eye}(r)+F. \quad\quad (VIa)$$

This gives the power, lens plus eye, for the subject viewing a distant object. For viewing a near object, as in reading, there is a power shift if the subject is unable to fully accommodate. This power shift is relative to their add requirement, given as ADD. For viewing a near (40 cm object) the power of the lens plus eye combination becomes:

$$P(r)=P_{CL}(r)+P_{eye}(r)+F-ADD. \quad\quad (VIb)$$

The power of the contact lens plus eye can be related to the wavefront of the contact lens plus eye in similar fashion to what was shown in Equation II. It is as follows:

$$P(r) = \frac{1}{r}\frac{\partial W(r)}{\partial r}. \quad\quad (VII)$$

The wavefront, W, of the contact lens plus eye is given by $$W(R) = \int_0^R rP(r)\,dr \quad\quad (VIII)$$

where R gives the radial distance from the center of the lens (and eye, and wavefront).

Given the wavefront W, the pupil function (PF) is $$PF(r) = A(r)e^{-i\frac{2\pi}{\lambda}W(r)}. \quad\quad (IX)$$

The pupil function is the complex amplitude within the pupil, and is zero outside of the pupil (i.e. A(r)=0 when r>D/2 where D is pupil diameter). The amplitude point spread function (PSFa) of an optical system, in this case the lens plus eye, is given as the Fourier transform of the pupil function P(r).

$$PSFa(u)=\int PF(r)e^{-i\cdot 2\cdot \pi\cdot v}dr \quad\quad (X)$$

with the integration done over the pupil radius. The quantity u is related on the angle in radians in the object space:

$$\theta=\lambda\cdot u. \quad\quad (XI)$$

The intensity point spread function, PSF, is $$PSF(u)=PSFa(u)\cdot PSFa*(u) \quad\quad (XII)$$

where * refers to complex conjugate.

The optical transfer function, OTF is given as the Fourier transform of the PSF.

$$OTF(v)=\int PSF(\theta)e^{-i2\pi\cdot\theta\cdot v}d\theta \quad\quad (XIII)$$

where v is in cycles per radian.

The modulation transfer function, MTF, is $$MTF(v)=|OTF(v)|. \quad\quad (XIV)$$

The calculation of MTF from a wavefront as outlined above is well known in the art and can be done numerically.

The weighted area of the MTF (WA) is calculated according to the following equation:

$$WA = \int_0^{20 cycles/deg} MTF(v)^2 \cdot NCSF(v, D, L)^2 \, dv \quad\quad (XV)$$

wherein:
MTF is calculated as in equation XIV and is a function of the angular frequency, the pupil diameter, and the power profile of the lens plus eye combination;
NCSF is the neural contrast sensitivity function; and depends upon the frequency, the pupil diameter (d) and the luminance (L) expressed in candelas/m$^2$.

For a lens design that is not rotationally symmetric, the MTF is calculated as the average of the two-dimensional MTF.

A luminance of 250 cd/m$^2$ is exemplary of the invention and the NCSF is:

$$NCSF = \frac{1}{k\cdot \sqrt{2}\sqrt{\frac{2}{T}\left(\frac{1}{X_0^2}+\frac{1}{X_{max}^2}+\frac{v^2}{N_{max}^2}\right)\left(\frac{1}{\eta\cdot p\cdot E}+\frac{\Phi_0}{1-e^{-(v/v_0)^2}}\right)}} \quad\quad (XVI)$$

with $$E = \frac{\pi\cdot D^2}{4}\cdot L \quad\quad (XVII)$$

L is the luminance (250 cd/m$^2$),
D is the pupil diameter in mm,
And E is the illuminance in Td.
The constants are as follows:

| | | |
|---|---|---|
| k = 3.0 | T = 0.1 sec | $\eta$ = 0.03 |
| $\alpha_0$ = 0.5 arc min | $X_{max}$ = 12° | $\Phi_0$ = 3 × 10$^{-8}$ sec deg$^2$ |
| $C_{2b}$ = 0.08 arc min/mm | $N_{max}$ = 15 cycles | $u_0$ = 7 cycles/deg |

Descriptions of NCSF can be found, for example, in "Contrast Sensitivity of the Human Eye and its Effects on Image Quality" by Peter G. J. Barten published by SPIE Optical Engineering Press in 1999 which is incorporated herein by reference.

Using the weighted area, WA, the Monocular Performance (MP) can now be calculated using the following equation:

$$MP=-53.0+25.1*\log 10(WA)-3.8782*\log 10(WA)^2+0.1987*\log 10(WA)^3 \quad\quad (XVIII)$$

with log 10(WA) denoting a log base 10 logarithm of WA.

This quantity, which can be calculated from the measured power profiles or the design power profiles of individual lenses provides the basis for the constraints that describe the lens systems of the invention.

For each eye (left L and right R) MP is calculated for a distant object and a near object. The four quantities calculated are:

dL is MP calculated for a distant object for the lens in the left eye;

dR is MP calculated for a distant object for the lens in the right eye;

nL is MP calculated for a near object for the lens in the left eye;

nR is MP calculated for a near object for the lens in the right eye;

From these four quantities D and N are calculated:

D is the maximum MP for a distant object;

$$D = \max(dL, dR) \quad (XVIII)$$

and,

N is the maximum MP for a near object:

$$N = \max(nL, nR) \quad (XIX)$$

The mean values of D and N for pupil sizes between 2.5 and 6.0 mm diameter are calculated. The mean values are designated as $\overline{D}$ and $\overline{N}$.

The final value to be calculated to define the constraints is the disparity, $\overline{A}$, which is calculated as:

$$\overline{A} = [(dL - dR)^2 + (nL - nR)^2]^{0.5} \quad (XX)$$

The lens pairs (dominant eye lens and non-dominant eye lens) of the system of lenses of the invention satisfy the following relationships for all patient add and sphere requirements:

$$\overline{D} \geq -1.0 \times ADD + 0.53$$

$$\overline{N} \geq -1.40 \times ADD$$

$$\overline{A} \leq 1.65 \times ADD - 1.2$$

where $\overline{D}$, $\overline{N}$, $\overline{A}$, and ADD are as described above where ADD, in this case is the add need of the subject not the "add" of the lens.

Preferred embodiments of the invention are lenses having a central zone with power that is more plus or "near" so this lens has a "center near" design. Even more preferably, they have optic zones that are continuous aspheric surfaces. Thus, the most preferred embodiments have a "center near continuous aspheric" design and are described as follows:

A three lens system of low, mid, and high add lenses is provided with each of the lens having a rotationally symmetric power profile of the following form.

$$P = P_0 + b + c_1 \cdot r \text{ in central zone for } r \leq r_{central},$$

$$P = P_0 + c_2 \cdot r^2 \text{ in outer zone for } r \geq r_{outer},$$

and P is described by a piecewise cubic Hermite interpolating polynomial in the transition region $r_{central} \leq r \leq r_{outer}$ where the constants $P_0$, $c_1$, $c_2$, b, and the form of the piecewise cubic Hermite interpolating polynomial is different for each lens of the family of lenses.

b for the low, mid, and high lenses is progressively greater, varying from ~0.1 D to 1.0 D, $P_0$ is also progressively greater, varying from 0.25 D to 0.75 D, $c_1$ is small, with values from 0 to being slightly negative (−0.1 D/mm), $c_2$ is approximately −0.08 D/mm², $r_{outer}$ is or about 2.0 mm, and $r_{central}$ is in the range of 0.2 to 1.0 mm.

Other preferred embodiments include lenses having a "zone multifocal surface". Such lenses have a discontinuity in power as one moves from one power zone to another power zone. The aspheric back surface in the central portion preferably has a radius of approximately 7.20 to about 8.10 mm and more preferably 7.85 mm, from the geometric center to the edge of the central optical zone and a conic constant of −0.26.

In the zone designs of the invention, on the front or anterior surface, the first zone, or the zone that is centered at the geometric center of the lens may be, and preferably is, a zone that provides near vision correction or it may provide distance or intermediate vision correction. In lens pairs, the first zone may be the same or different. Similarly, in continuous, aspheric multifocal designs, the correction at the center of each of the lens pairs may be the same or different and may be selected from distance, intermediate and near correction.

Contact lenses that may be designed according to the invention preferably are soft contact lenses. Soft contact lenses, made of any material suitable for producing such lenses, preferably are used. Illustrative materials for formation of soft contact lenses include, without limitation silicone elastomers, silicone containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Pat. No. 6,846,892 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

EXAMPLES

The examples and data were obtained from calculated values based on lens designs, not manufactured lenses. Within each table, a "+" indicates that the lens meets the constraints of the invention.

Example 1

Figure 7:
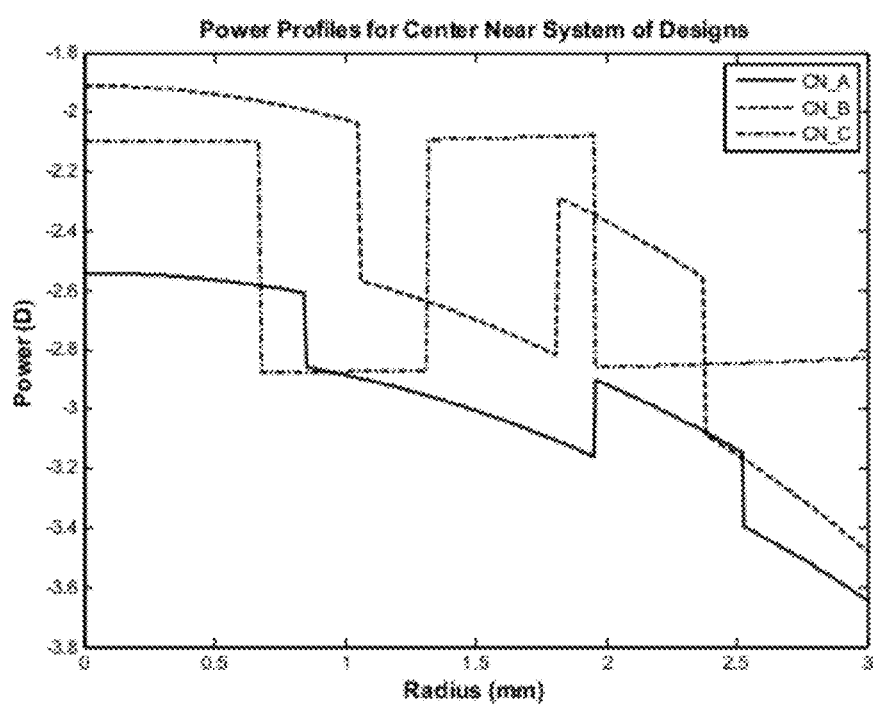
FIG. 7 is a graph depicting the power profiles for a Center Near system of designs of the invention.

A system of lenses is made up across a range of distance corrective powers and three add powers. Each lens has radial zones of varying power. The central zone has power that is more plus or "near" so this lens has a "center near" design. The lenses are designated as "A", "B", and "C" and individually provide progressively better near vision performance. The power profiles for the exemplary −3.0 D lens of this system of lenses are shown in FIG. 7.

The following table shows by add need (+0.75 to +2.50 D) the lens pairs that meet the criteria for the family of lenses of the invention. The AA pair (an A lens in each of the two eyes) meets the above requirements for 0.75, 1.0, and 1.25 D add requirement. The AB pair does not meet the requirement for any add powers. For 1.50, 1.75, and 2.00 D add requirement either the BB or the BC pair meets the requirements. For high adds the BC pair is required. There is a pair of lenses that meets the above constraints for each add requirement.

| | Center Near | | | | | | | |
|---|---|---|---|---|---|---|---|---|
| | 0.75 | 1 | 1.25 | 1.5 | 1.75 | 2 | 2.25 | 2.5 |
| AA | + | + | + | | | | | |
| AB | | | | | | | | |
| BB | | | | + | + | + | | |
| BC | | | | + | + | + | + | + |

Example 2

Figure 2:
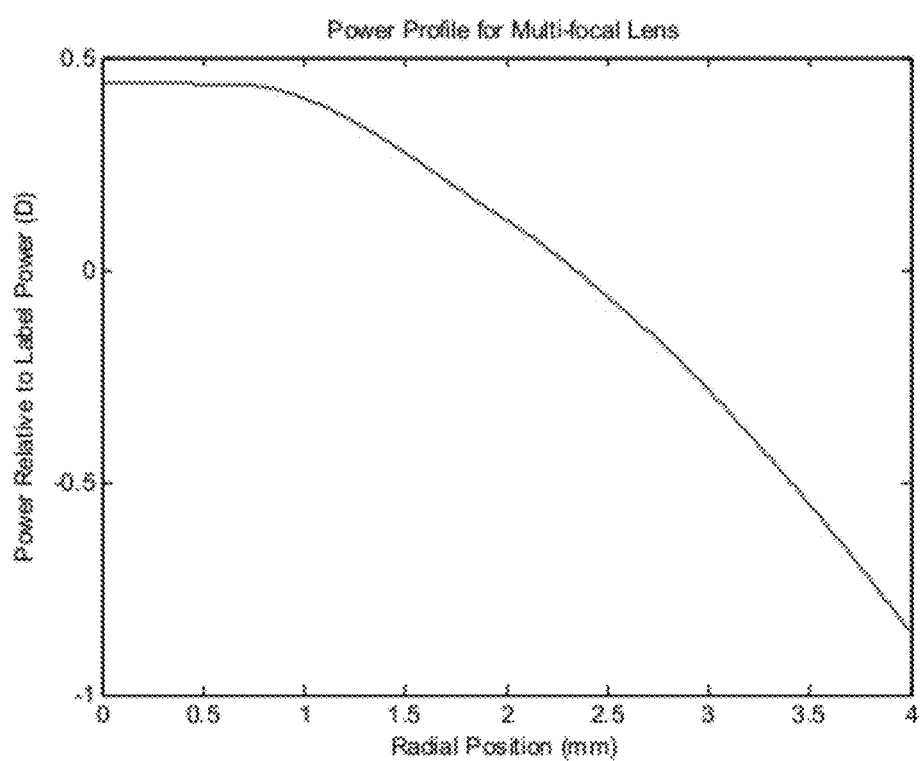
FIG. 2 is a graph depicting a power profile of a low add lens of the invention
Figure 3:
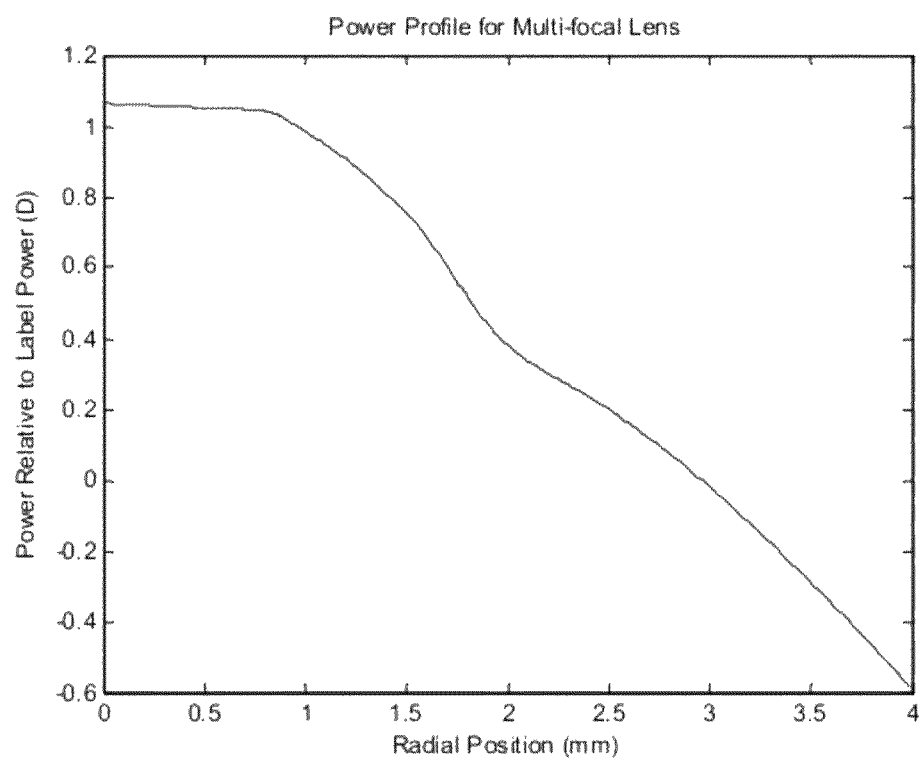
FIG. 3 is a graph depicting a power profile of a mid add lens of the invention.
Figure 4:
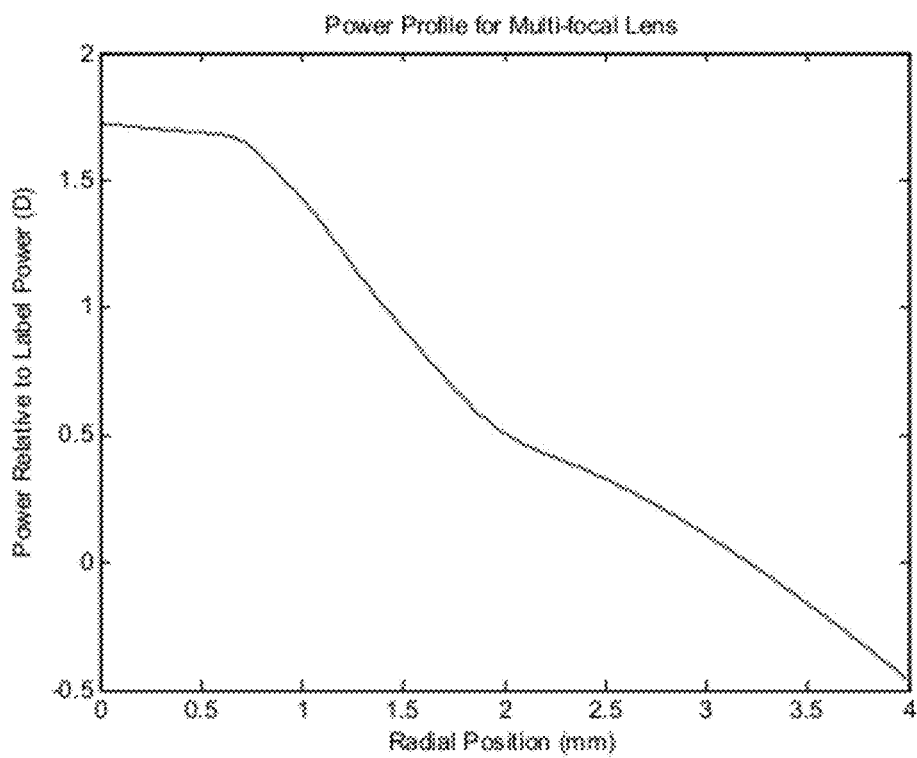
FIG. 4 is a graph depicting a power profile of a high add lens of the invention.

A system of lenses is made up across a range of distance corrective powers and three add powers. The central zone has power that is more plus or "near" and the optic zone is a continuous asphere, so lens is a "center near continuous asphere" design. The lenses are designated as "A", "B", and "C" and provide progressively better near vision performance. The power profiles for the exemplary −3.00 D lens are shown in FIGS. 2, 3 and 4.

The following table shows the pairs by add that meet the criteria for the family of lenses of the invention. There is at least one pair of lenses that meets the requirement for all add powers.

| | Continuous Asphere | | | | | | | |
|---|---|---|---|---|---|---|---|---|
| | 0.75 | 1 | 1.25 | 1.5 | 1.75 | 2 | 2.25 | 2.5 |
| AA | + | + | + | | | | | |
| AB | | | | | | | | |
| BB | | | | + | + | + | | |
| BC | | | | | | | + | + |

Example 3

Figure 8:
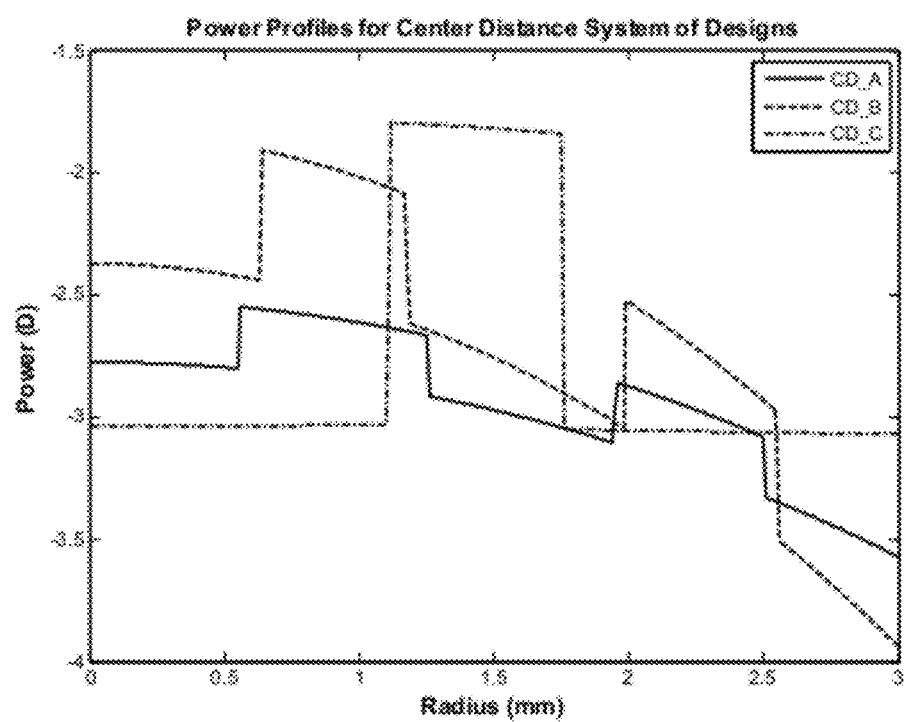
FIG. 8 is a graph depicting the power profiles for a Center Distance system of designs of the invention.

A system of lenses is made up across a range of distance corrective powers and three add powers. In this case the central zone has more minus power than the adjacent zone so the lens has a "center distance" ring design. The lenses are designated as "A", "B", and "C" and provide progressively better near vision performance The power profiles for the exemplary −3.00 D lenses are shown in FIG. 8. The following table shows the pairs by add that meet the above constraints. There is at least one pair of lenses that meets the requirement for all add powers.

| | Center Distance | | | | | | | |
|---|---|---|---|---|---|---|---|---|
| | 0.75 | 1 | 1.25 | 1.5 | 1.75 | 2 | 2.25 | 2.5 |
| AA | + | + | + | | | | | |
| AB | | | | | + | | | |
| BB | | | + | + | + | | | |
| BC | | | | | | | + | + |

Example 4

Comparative

A system of lenses using a design according to the prior art is made up across a range of distance corrective powers and three add powers. The central zone has power that is more plus or "near" so this lens has a "center near" design. The lenses are designated as "A", "B", and "C" and provide progressively better near vision performance.

The following table shows the pairs by add for this prior art system. There are not pairs that satisfy the constraints for all possible add requirements, thus this system of lenses does not meet the requirements of this invention.

| | Example System Not of Invention | | | | | | | |
|---|---|---|---|---|---|---|---|---|
| | 0.75 | 1 | 1.25 | 1.5 | 1.75 | 2 | 2.25 | 2.5 |
| AA | + | + | + | | | | | |
| AB | | | | | | | | |
| BB | | | + | + | + | + | | |
| BC | | | | | | | | |

The examples given show a single design type (center near, continous asphere, and center distance) making up each system. A system can be made up of mixed types. For instance, the A lenses of the Center Near and the Continous Asphere systems could be exchanged and the two new systems would still meet the three constraints.

There are other design types that will satisfy the constraints. For example, diffractive lenses and various types of non-rotationally symmetric designs could be made to meet the constraints of the invention described above.

We claim:
1. A lens pair that satisfy a predetermined set of conditions, the lens pair conditions comprising:

$$\overline{D} \geq -1.0 \times ADD + 0.53;$$

$$\overline{N} \geq -1.40 \times ADD; \text{ and}$$

$$\overline{A} \leq 1.65 \times ADD - 1.2,$$

wherein $\overline{D}$ is the mean of the monocular performance of the left and right eyes averaged over pupil size ranging from 2.5 to 6.0 mm in diameter for a distant object, $\overline{N}$ is the mean of the monocular performance of the left and right eyes averaged over pupil size ranging from 2.5 to 6.0 mm in diameter for a near object, $\overline{A}$ is the mean disparity in monocular performance between the left and right eyes averaged over pupil size ranging from 2.5 to 6.0 mm in diameter, and ADD is the extra plus power that an eye care professional determined is required for seeing up close.

2. A system of lenses that satisfy a predetermined set of following conditions, the lens pair conditions comprising:

$\overline{D} \geq -1.0 \times ADD + 0.53$ $\overline{N} \geq -1.40 \times ADD$ $\overline{A} \leq 1.65 \times ADD - 1.2$ wherein $\overline{D}$ is the mean of the monocular performance of the left and right eyes averaged over pupil size ranging from 2.5 to 6.0 mm in diameter for a distant object, $\overline{N}$ is the mean of the monocular performance of the left and right eyes averaged over pupil size ranging from 2.5 to 6.0 mm in diameter for a near object, $\overline{A}$ is the mean disparity in monocular performance between the left and right eyes averaged over pupil size ranging from 2.5 to 6.0 mm in diameter, and ADD is the extra plus power that an eye care professional determined is required for seeing up close.

3. The lens pair of claim 1, wherein the pair is elected from a set of lenses to meet add needs from about +0.75 to about +2.50 diopters and range of distance powers from about −12.00 to about +8.00 diopters.

4. The lens pair of claim 1, wherein at least one lens of the lens pair comprises a surface that is a continuous aspheric surface.

5. The lens pair of claim 1, wherein at least one lens of the lens pair comprises a center-near design.

6. The lens pair of claim 1, wherein at least one lens of the lens pair comprises a center distance design.

7. The lens pair of claim 1, wherein at least one lens of the lens pair comprises a center distance design.

8. The lens pair of claim 1, wherein in at least one lens of the lens pair has an aspheric surface.

9. A method for correcting presbyopia, comprising the steps of providing a first lens and a second lens to form a lens pair, wherein the first and second lens are selected from a family of lenses having following relationships:

$\overline{D} \geq -1.0 \times ADD + 0.53;$ $\overline{N} \geq -1.40 \times ADD;$ and $\overline{A} \leq 1.65 \times ADD - 1.2,$ wherein $\overline{D}$ is the mean of the monocular performance of the left and right eyes averaged over pupil size ranging from 2.5 to 6.0 mm in diameter for a distant object, $\overline{N}$ is the mean of the monocular performance of the left and right eyes averaged over pupil size ranging from 2.5 to 6.0 mm in diameter for a near object, $\overline{A}$ is the mean disparity in monocular performance between the left and right eyes averaged over pupil size ranging from 2.5 to 6.0 mm in diameter, and ADD is the extra plus power that an eye care professional determined is required for seeing up close.

10. The method of claim 9 wherein each lens has a power profile different from that of the other lens.

11. The method of claim 9 wherein the lens pair is elected from a set of lenses meeting an add need from about 0.75 to about 2.50 diopters and range of distance powers from about −12.00 to about +8.00 diopters.

12. The method of claim 9, wherein at least one lens of the lens pair comprises a surface that is a continuous aspheric surface.

13. The method of claim 9, wherein at least one lens of the lens pair comprises a center-near design.

14. The method of claim 9, wherein at least one lens of the lens pair comprises a center distance design.

15. A system of lenses with each of the lens having a rotationally symmetric power profile of the following form:

$P = P_0 + b + c_1 \cdot r$ in central zone for $r \leq r_{central}$, $P = P_0 + c_2 \cdot r^2$ in outer zone for $r \geq r_{outer}$, and P is described by a piecewise cubic Hermite interpolating polynomial in the transition region $r_{central} \leq r \leq r_{outer}$ where the constants $P_0$, $c_1$, $c_2$, b, and the form of the piecewise cubic Hermite interpolating polynomial is different for each lens of the family of lenses, b for the low, mid, and high lenses is progressively greater, varying from ~0.1 D to 1.0 D, $P_0$ is also progressively greater, varying from 0.25 D to 0.75 D, $c_1$ is small, with values from 0 to being slightly negative (−0.1 D/mm), $c_2$ is approximately −0.08 D/mm$^2$, $r_{outer}$ is or about 2.0 mm, and $r_{central}$ is in the range of 0.2 to 1.0 mm.

16. The lenses of claim 15, wherein the range of distance powers is from about −12.00 to about +8.00 diopters.

17. The lenses claim 15, wherein at least one lens of the lens system comprises a surface that is a continuous aspheric surface.

18. The lenses of claim 15, wherein at least one lens of the lens system comprises a center-near design.

19. The lenses of claim 15, wherein at least one lens of the lens system comprises a center distance design.

* * * * *